US008397778B2

(12) United States Patent
Marsaly et al.

(10) Patent No.: US 8,397,778 B2
(45) Date of Patent: Mar. 19, 2013

(54) FLAT-RUNNING DEVICE FOR A MOTOR VEHICLE AND MOUNTED ASSEMBLY INCORPORATING IT

(75) Inventors: Olivier Marsaly, L'Isle Adam (FR); Bruno Pelletier, Persan (FR)

(73) Assignee: Hutchinson, Paris (FR)

( * ) Notice: Subject to any disclaimer, the term of this patent is extended or adjusted under 35 U.S.C. 154(b) by 543 days.

(21) Appl. No.: 12/683,645

(22) Filed: Jan. 7, 2010

(65) Prior Publication Data

US 2010/0170607 A1 Jul. 8, 2010

(30) Foreign Application Priority Data

Jan. 8, 2009 (FR) ...................................... 09 00051

(51) Int. Cl.
*B60C 17/06* (2006.01)
*B60C 15/028* (2006.01)
(52) U.S. Cl. ........................................ 152/520; 152/158
(58) Field of Classification Search .................. 152/158, 152/520; *B60C 17/04, 17/06*
See application file for complete search history.

(56) References Cited

U.S. PATENT DOCUMENTS

| 5,450,887 | A | | 9/1995 | Habay et al. |
| 5,975,171 | A | * | 11/1999 | Rivaton .......................... 152/158 |
| 2006/0005906 | A1 | * | 1/2006 | Resare et al. .................. 152/158 |

FOREIGN PATENT DOCUMENTS

| EP | 0 635 384 | 1/1995 |
| EP | 1 541 384 | 6/2005 |

OTHER PUBLICATIONS

Search Report from Application No. FR 0900051 dated Aug. 13, 2009.

* cited by examiner

*Primary Examiner* — Justin Fischer
*Assistant Examiner* — Philip N Schwartz
(74) *Attorney, Agent, or Firm* — Alston & Bird LLP

(57) ABSTRACT

The present invention relates to a flat-running device intended for equipping a mounted assembly without an air chamber for a motor vehicle, and to such a mounted assembly incorporating this device.

Figure 1:
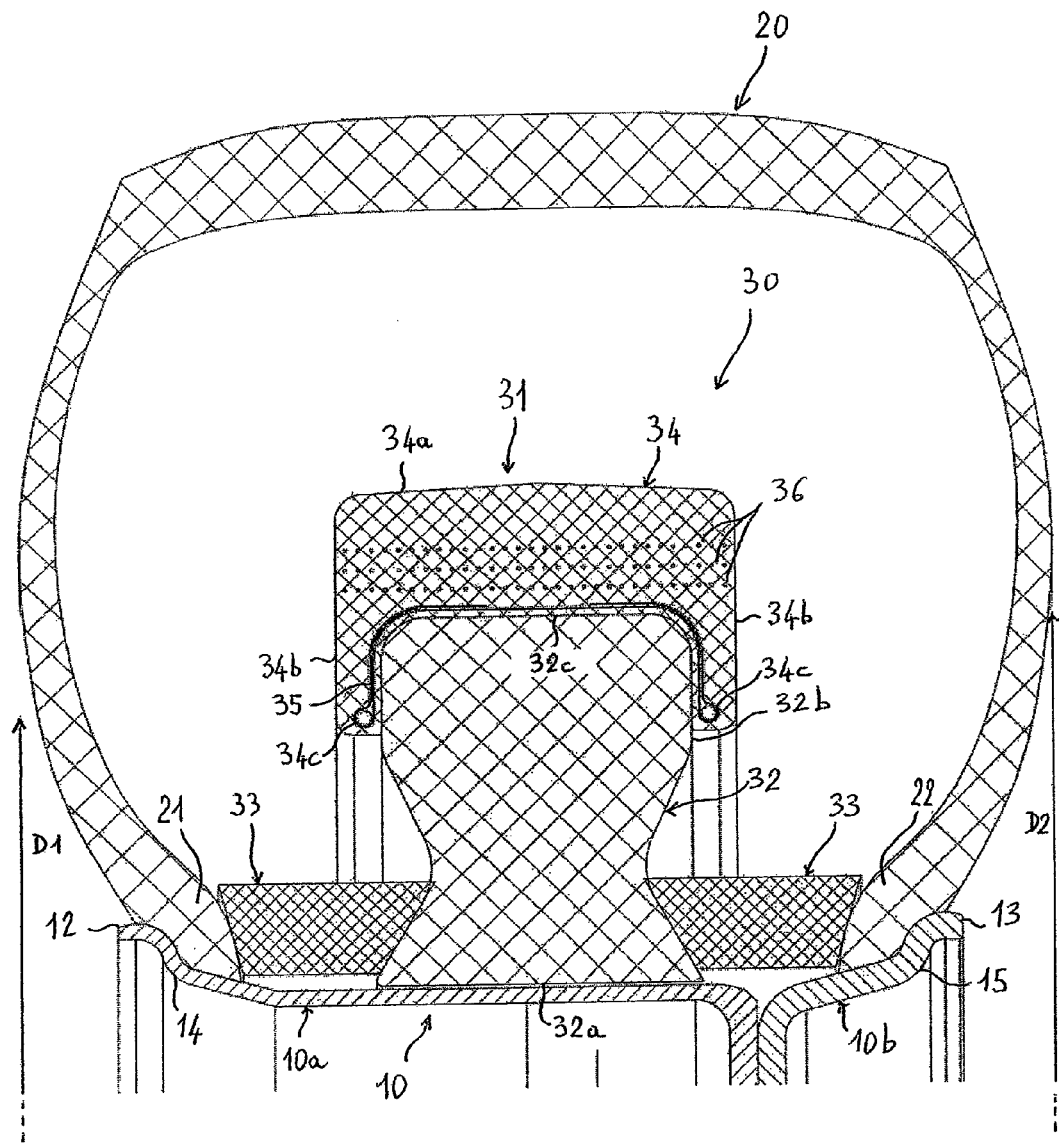

This device (30) comprises a wheel rim (10) with a plurality of blocks (10*a* and 10*b*) and a tire (20) comprising beads (21 and 22) mounted against flanges (12 and 13) of the rim, the device comprising:

a structure (31) for supporting the tire, which structure is to be mounted around the rim and is divided into ring sectors (32) in the form of an arc of a circle, surmounted by a casing (34) which is intended for supporting the tire when the latter is running flat and which has two projecting lateral portions (34*b*) partially covering lateral faces (32*b*) of the structure, and means (33) for locking the beads against said flanges, which connect the annular supporting structure to the beads.

According to the invention, these lateral portions incorporate means (34*c*) for holding the sectors, opposing the axial displacement of the latter under lateral forces in the event of a shock during running in the inflated state or in the event of running flat, so that these sectors remain surmounted by the casing.

19 Claims, 2 Drawing Sheets

FLAT-RUNNING DEVICE FOR A MOTOR VEHICLE AND MOUNTED ASSEMBLY INCORPORATING IT

BACKGROUND OF THE INVENTION

The present invention relates to a flat-running device intended for equipping a mounted assembly without an air chamber for a motor vehicle having a multi-block wheel rim, and to such a mounted assembly incorporating this device and making it possible to cover a long distance at relatively high speed when the mounted assembly is partially or completely deflated. This flat-running device can be used particularly for equipping a military vehicle intended for traveling on all types of ground, including sandy ground.

The known flat-running devices for mounted assemblies comprising a multi-block rim conventionally comprise:

an annular supporting structure which is intended to be mounted around the rim for the purpose of supporting the flat-running tire and which is divided into a plurality of ring sectors in the form of an arc of a circle placed end to end in the circumferential direction, and means for locking the beads against the rim flanges, as is described, for example, in the document EP-A-1 900 551 in the name of the Applicant.

In this document, these sectors are surmounted by a rubber-based tire support casing which projects axially on either side of the lateral faces of the supporting structure, at the same time covering them partially, and which is designed, in particular, to protect this structure in a flat-running situation and the tire when it is running in the inflated state.

BRIEF SUMMARY OF THE INVENTION

An object of the present invention is to propose a flat-running device which is improved, as compared with that given in this document, in that it ensures, particularly under all circumstances, that the ring sectors are held under this support casing. This device comprises:

an annular structure for supporting the tire, which is intended to be mounted around a multi-block wheel rim and which is divided into at least two ring sectors in the form of an arc of a circle forming this structure by being juxtaposed in the circumferential direction, all the sectors being surmounted by a radially outer support casing which is intended for supporting the tire after an inflation pressure drop inside the mounted assembly and which comprises two lateral portions projecting axially on either side of the lateral faces of the structure and partially covering these faces, and means for locking the beads against the rim flanges, which connect the annular supporting structure to the beads.

To achieve this, a device according to the invention is such that the casing incorporates in its lateral portions means for holding the sectors which are capable of opposing the axial displacement of the latter under lateral forces in the event of a shock during running in the inflated state or in the event of running flat, so that the sectors remain surmounted by the casing.

It will be noted that these holding means thus satisfactorily oppose the lateral "dislocation" of the sectors out of the support casing, by ensuring that these sectors are mutually fixed and centered together solely by being covered by this casing.

Preferably, the ring sectors are mounted end to end, being free of any connecting member between their mutually confronting ends, that is to say being independent because of the absence of a mechanical connection between sectors. Mounting "end to end" is understood in the present description to mean contact, with or without mutual interlocking, of the respective ends of the mutually confronting sectors.

Alternatively, it will be noted that these sector ends could be mounted with play (that is to say, not end to end), being equipped, if appropriate, with such separate connecting members.

Optionally, the supporting structure according to the invention may be mounted on an annular base or sole plate arranged on the bottom of the rim and making it possible both to facilitate the mounting of the device and to protect the rim with respect to ring sectors.

According to another characteristic of the invention, the support casing, preferably rubber-based, may be mounted without mechanical or adhesive fastening in contact with the ring sectors in a contact surface comprising a substantially cylindrical inner axial surface of the casing and two collar-shaped inner radial surfaces of this casing which prolong this axial surface radially inward.

According to another characteristic of the invention, said holding means may be formed by at least one pair of circumferential reinforcing elements respectively located in two radially inner zones of said lateral portions, in such a way that the diameter of each pair of reinforcing elements is smaller than the diameter of said inner axial surface of the casing.

Advantageously, each of said reinforcing elements may comprise a non-extendible circular rod, for example metallic or made from aramid, which is embedded in the mass of said lateral portion incorporating it and which is capable of laying the latter axially against the corresponding lateral face of the ring sectors. Alternatively, each circumferential reinforcing element could consist of a flexible or rigid ring formed by a winding of a non-extendible textile chord (for example, made from aramid) or by a metallic chord, this winding therefore not having a closed circular geometry, but, instead, an open geometry with two ends between which turns are formed.

According to another characteristic of the invention, said pair of reinforcing elements may be connected to one another by means of a connecting element extending radially along said lateral portions and axially in the immediate vicinity of said inner axial surface of the casing, this connecting element being capable of holding the casing against the ring sectors. This connecting element preferably comprises a textile fabric gripping said rods and extending over the entire circumference of the support casing, substantially parallel to said inner axial and radial surfaces of the casing, this connecting element being capable of being substantially in the form of an upturned U in axial section.

Advantageously, the support casing has a top central portion, from which said lateral portions extend and which may incorporate a reinforcing insert intended for ensuring the "centrifuging" stability of the supporting structure during running in the inflated state, by opposing the radial displacement of the latter as a result of the centrifugal force effect.

The reinforcing insert is embedded in the support casing radially above said connecting element and at a distance from the radially outer face of said top portion, and it may advantageously comprise one or more circumferential windings of at least one non-extendible cord, for example metallic or made from aramid, this reinforcing insert preferably consisting of a plurality of these windings arranged coaxially.

It will be noted that this reinforcing insert could comprise additional textile and/or metallic reinforcements, in order to improve the mechanical behavior of the support casing both during running in the inflated state, by opposing the above-mentioned "centrifuging", and when running flat.

According to another characteristic of the invention, said locking means which the flat-running device comprises may comprise at least one pair of annular wedges which are based on rubber reinforced, for example, by rods and which are respectively mounted in contact with the two lateral faces of the supporting structure. These wedges, of which there are preferably two, may each be formed in one piece and have a substantially trapezoidal axial section, each wedge bearing against a radially inner bearing zone of oblique profile of the corresponding lateral face of the supporting structure.

A mounted assembly without an air chamber according to the invention for a motor vehicle comprises a wheel rim with a plurality of blocks, a tire comprising beads respectively mounted against axially inner and outer flanges of the rim, and a flat-running device mounted around the rim between said flanges, this mounted assembly being such that the device is as defined above in relation to the present invention.

BRIEF DESCRIPTION OF THE SEVERAL VIEWS OF THE DRAWING(S)

Figure 2:
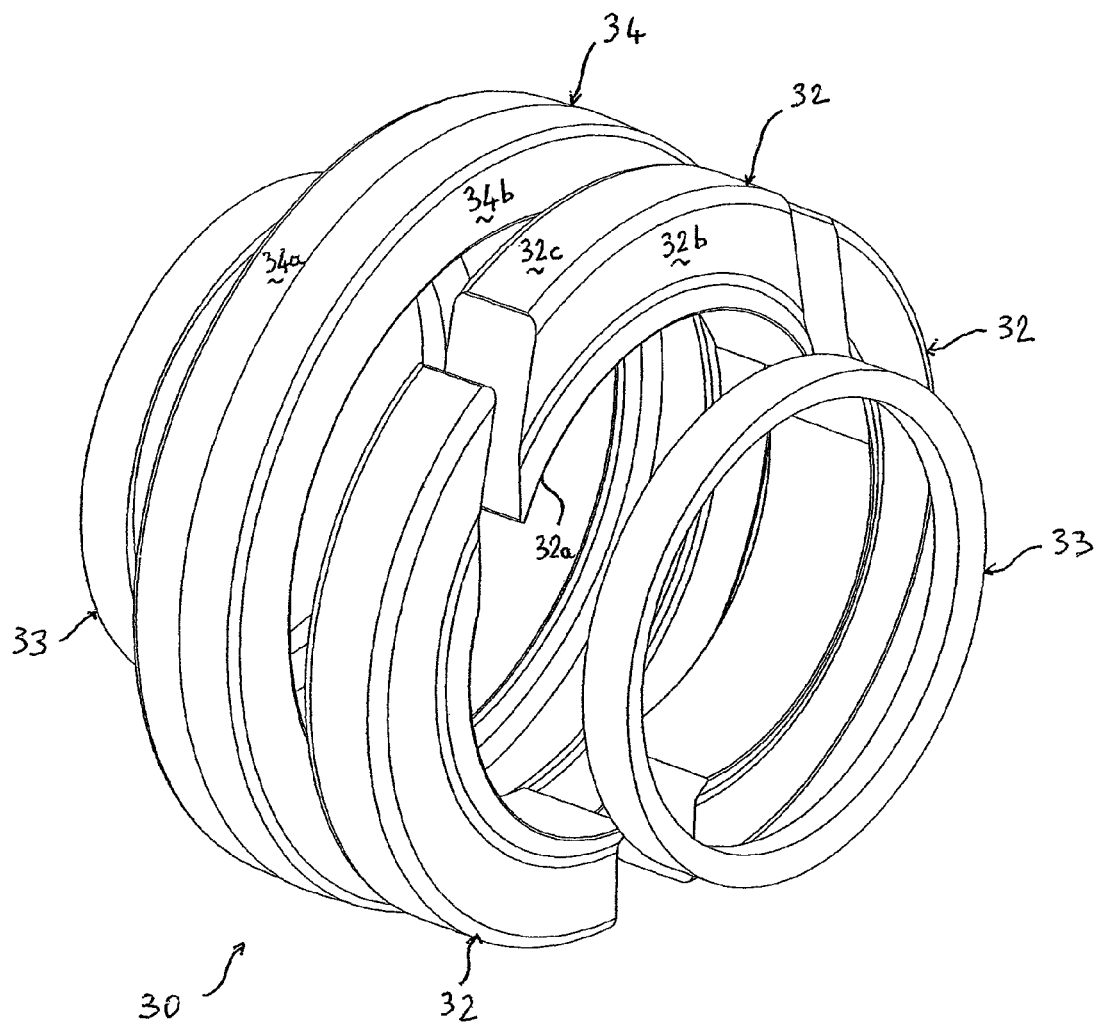

Other characteristics, advantages and details of the present invention will become apparent from a reading of the following description of several exemplary embodiments of the invention which are given as an illustration and in a non-limiting way, the description being made with reference to the accompanying drawings of which:

FIG. 1 is a diagrammatic view, in axial half-section, of a mounted multi-block rim assembly incorporating a flat-running device according to the invention, and FIG. 2 is an exploded perspective view of the flat-running device of FIG. 1.

DETAILED DESCRIPTION OF THE INVENTION

In the present description, the expressions "axially inner" and "axially outer" refer respectively to the sides of the wheel rim which are intended to face toward the inside and toward the outside of the motor vehicle after a mounted assembly comprising this rim has been mounted on a vehicle.

The mounted assembly 1 according to the invention, which is illustrated in FIG. 1, comprises a wheel rim 10 with two blocks 10a and 10b secured to one another by fastening means (not illustrated), for example of the bolt type.

The two blocks 10a and 10b comprise respectively axially inner and outer flanges 12 and 13 respectively delimiting two rim seats 14 and 15 extending axially from the flanges 12 and 13, a tire 20, the beads 21 and 22 of which are mounted so as to bear on the seats 14 and 15 against the flanges 12 and 13, and a flat-running device 30 mounted around the rim 10 within the tire 20 and intended for supporting the latter after an inflation pressure drop inside the mounted assembly 1.

In the example of FIG. 1, the flat-running device 30 is mounted on a rim bottom 10 of substantially flat type, and it comprises:
an annular supporting structure 31 which is intended to be mounted on the rim 10 for the purpose of supporting the tire 20 after an inflation pressure drop inside the mounted assembly 1 and which is divided into ring sectors 32 in the form of an arc of a circle (of which there are three in the example of FIG. 2) which are not connected to one another and which form the structure 31 by their mutually confronting ends being juxtaposed end to end in the circumferential direction, and
two annular wedges 33 for locking the beads 21 and 22 against the rim flanges 12 and 13, which wedges connect the structure 31 to the beads 21 and 22, being applied laterally to the sectors 32 during the mounting of the device 30 on the rim 10, and which are formed in one piece, based on rubber reinforced by a rod (not illustrated).

Each sector 32 may be produced from a metallic, plastic or composite material, and, in the example of FIG. 1, it is in the form of a solid beam with a substantially knucklebone-shaped outer surface, that is to say with a geometry converging from a radially inner face 32a and then diverging radially outward as far as an upper section 32b of constant and maximum axial width for this sector 32, which terminates in a radially outer face 32c. These faces 32a and 32c have a flat profile in axial section in this exemplary embodiment, and the respective outer faces 32c of the sectors 32 are all covered by a rubber-based support casing 34 which is intended for supporting the tire 20 when the latter is running flat.

It will be noted that each sector of a device according to the invention could have a structure which is not solid, but hollow (for example, partitioned via a radial partition), and/or a different outer profile in the region of its lateral faces.

As illustrated in FIG. 1, the casing 34 radially surmounts the whole of the supporting structure 31 (without a mechanical or adhesive connection), at the same time having an axially central top portion 34a which is prolonged radially inward by two lateral portions 34b projecting axially on either side of the lateral faces of each sector 32 and partially covering these faces. The casing 34 thus has substantially a form in the shape of an upturned U in axial section, matching the profile of the upper portion 32b of each sector 32, the web of the U being in contact with its outer face 32c, and the wings of the U being in contact with virtually the entire radial height of the lateral faces of each section 32b.

According to the invention, a non-extendible circular rod 34c (for example, metallic or made from aramid) is embedded in a radially inner zone of each lateral portion 34b in order to hold the sectors 32 inside the casing 34 by opposing their axial displacement under lateral forces in the event of a shock during running in the inflated state or in the event of running flat. Each rod 34c is thus located in the immediate vicinity of the radially inner end of the corresponding lateral portion 34b, so that the diameter D1 of each rod 34c is markedly smaller than the diameter D2 of the inner axial surface of the top portion 34a. These two rods 34c are connected to one another by means of a connecting textile fabric 35 of annular geometry which grips them and forms an upturned U in axial section (this fabric 35 extends radially along the lateral portions 34b and axially along the inner surface of the top portion 34a), the effect of which is to lay the lateral portions 34b against the mutually confronting lateral faces of the sectors 32 and therefore to hold the casing 34 against the latter.

As can also be seen in FIG. 1, the support casing 34 incorporates, furthermore, a reinforcing insert 36 which is intended for ensuring the "centrifuging" stability of the sectors during running in the inflated state and which is embedded in the casing 34 radially between the connecting fabric 35 and the radially outer face of the top portion 34a. In the example of FIG. 1, this reinforcing insert 36 consists of a plurality of coaxial circumferential windings of non-extendible cords on different diameters (for example, metallic or made from aramid), although it could comprise a single winding and/or other reinforcing elements capable of ensuring this "centrifuging" stability.

In order to mount this flat-running device 30 inside the mounted assembly 1, the following procedure is advantageously adopted.

The support casing 34 is first introduced inside the tire 20 and then the ring sectors 32 are inserted into the casing 34 by being positioned end to end. With regard to the locking wedges 33, these may be applied at any moment between the sectors 32 and the beads 21 and 22 of the tire 20.

The invention claimed is:

1. A flat-running device intended for equipping a mounted assembly for a motor vehicle, which comprises a wheel rim with a plurality of blocks and a tire comprising beads mounted against flanges of the rim, the device comprising:
   an annular structure for supporting the tire, which is intended to be mounted around the rim and which is divided into at least two ring sectors in the form of an arc of a circle forming this structure by being juxtaposed in the circumferential direction, all the sectors being surmounted by a radially outer support casing which is intended for supporting the tire after an inflation pressure drop inside the mounted assembly and which comprises two lateral portions projecting axially on either side of the lateral faces of the structure and partially covering these faces, and
   means for locking the beads against said flanges, which connect the annular supporting structure to the beads,
   wherein said support casing incorporates in its lateral portions holding means for holding the ring sectors, which are capable of opposing the axial displacement of the sectors under lateral forces in the event of a shock during running in the inflated state or in the event of running flat, so that these sectors remain surmounted by the casing, the casing having an inner axial surface prolonged radially inward by two collar-shaped inner radial surfaces of the casing in contact with the sectors,
   the holding means being formed by at least one pair of circumferential reinforcing elements respectively located in two radially inner zones of said lateral portions, the diameter (D1) of each pair of reinforcing elements being markedly smaller than the diameter (D2) of said inner axial surface of the casing.

2. The flat-running device as claimed in claim 1, wherein the ring sectors are mounted end to end, being free of any connecting member between their mutually confronting ends.

3. The flat-running device as claimed in claim 1, wherein said support casing is mounted without mechanical or adhesive fastening in contact with the ring sectors in a contact surface comprising said inner axial surface of the casing which is substantially cylindrical and said two collar-shaped inner radial surfaces of this casing.

4. The flat-running device as claimed in claim 2, wherein said support casing is mounted without mechanical or adhesive fastening in contact with the ring sectors in a contact surface comprising said inner axial surface of the casing which is substantially cylindrical and said two collar-shaped inner radial surfaces of this casing.

5. The flat-running device as claimed in claim 1, wherein each of said reinforcing elements comprises a non-extendible circular rod, for example metallic or made from aramid, which is embedded in the mass of said lateral portion incorporating it and which is capable of laying the latter axially against the corresponding lateral face of the ring sectors.

6. The flat-running device as claimed in claim 1, wherein said pair of reinforcing elements are connected to one another by means of a connecting element extending radially along said lateral portions and axially in the immediate vicinity of said inner axial surface of the casing this connecting element being capable of holding the casing against the ring sectors.

7. The flat-running device as claimed in claim 5, wherein said pair of reinforcing elements are connected to one another by means of a connecting element extending radially along said lateral portions and axially in the immediate vicinity of said inner axial surface of the casing this connecting element being capable of holding the casing against the ring sectors.

8. The flat-running device as claimed in claim 6, wherein said connecting element comprises a textile fabric gripping said rods and extending over the entire circumference of the support casing substantially parallel to said inner axial and radial surfaces of the casing, this connecting element preferably being substantially in the form of an upturned U in axial section.

9. The flat-running device as claimed in claim 7, wherein said connecting element comprises a textile fabric gripping said rods and extending over the entire circumference of the support casing substantially parallel to said inner axial and radial surfaces of the casing, this connecting element preferably being substantially in the form of an upturned U in axial section.

10. The flat-running device as claimed in claim 1, wherein said support casing has a top central portion from which said lateral portions extend and which incorporates a reinforcing insert intended for ensuring the stability of the supporting structure during running in the inflated state by opposing the radial displacement of the latter as a result of the centrifugal force effect.

11. The flat-running device as claimed in claim 10, wherein each of said reinforcing elements comprises a non-extendible circular rod, which is embedded in the mass of said lateral portion incorporating it and which is capable of laying the latter axially against the corresponding lateral face of the ring sectors, wherein said pair of reinforcing elements are connected to one another by means of a connecting element extending radially along said lateral portions and axially in the immediate vicinity of said inner axial surface of the casing, said connecting element being capable of holding the casing against the ring sectors, and wherein said reinforcing insert is embedded in said support casing radially above said connecting element and at a distance from the radially outer face of said top portion.

12. The flat-running device as claimed in claim 10, wherein said reinforcing insert is embedded in said support casing radially above said connecting element and at a distance from the radially outer face of said top portion.

13. The flat-running device as claimed in claim 12, wherein said reinforcing insert comprises one or more circumferential windings of at least one non-extendible cord, for example metallic or made from aramid, this reinforcing insert preferably consisting of a plurality of these windings arranged coaxially.

14. The flat-running device as claimed in claim 1, wherein said locking means comprise at least one pair of annular wedges based on reinforced rubber and respectively mounted in contact with the two lateral faces of the supporting structure.

15. The flat-running device as claimed in claim 7, wherein said locking means comprise at least one pair of annular wedges based on reinforced rubber and respectively mounted in contact with the two lateral faces of the supporting structure.

16. The flat-running device as claimed in claim 9, wherein said locking means comprise at least one pair of annular wedges based on reinforced rubber and respectively mounted in contact with the two lateral faces of the supporting structure.

17. The flat-running device as claimed in claim 14, wherein said wedges, of which there are two, are each formed in one piece and have a substantially trapezoidal axial section, each wedge bearing against a radially inner bearing zone of oblique profile of the corresponding lateral face of the supporting structure.

18. A mounted assembly for a motor vehicle, comprising a wheel rim with a plurality of blocks and with a substantially flat rim bottom, a tire comprising beads respectively mounted against axially inner and outer flanges of the rim, and a flat-running device mounted around the rim between these flanges, wherein this device is as defined in one of the preceding claims.

19. The flat-running device as claimed in claim 1, wherein said support casing has in axial section a shape of an upturned U matching the profile of an upper portion of each ring sector, the wings of the U being in contact with substantially the entire radial height of the lateral faces of this upper portion by said inner radial surfaces of the casing, the upper portion of each sector having a constant axial width.

* * * * *